(12) United States Patent
McBeth et al.

(10) Patent No.: US 12,051,247 B2
(45) Date of Patent: Jul. 30, 2024

(54) WIRELESS VEHICULAR SYSTEMS AND METHODS FOR DETECTING ROADWAY CONDITIONS

(71) Applicant: DISH NETWORK L.L.C., Englewood, CO (US)

(72) Inventors: Nathan McBeth, Aurora, CO (US); John Huynh, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 321 days.

(21) Appl. No.: 16/585,667

(22) Filed: Sep. 27, 2019

(65) Prior Publication Data

US 2021/0097311 A1    Apr. 1, 2021

(51) Int. Cl.
| | | |
|---|---|---|
| *G06V 20/58* | (2022.01) | |
| *B60W 30/09* | (2012.01) | |
| *B60W 40/06* | (2012.01) | |
| *G06N 20/00* | (2019.01) | |
| *G08G 1/01* | (2006.01) | |
| *H04W 4/44* | (2018.01) | |

(52) U.S. Cl.
CPC ............ *G06V 20/58* (2022.01); *B60W 30/09* (2013.01); *B60W 40/06* (2013.01); *G06N 20/00* (2019.01); *G08G 1/0112* (2013.01); *G08G 1/0141* (2013.01); *H04W 4/44* (2018.02); *B60W 2554/00* (2020.02); *B60W 2556/45* (2020.02)

(58) Field of Classification Search
None
See application file for complete search history.

(56) References Cited

U.S. PATENT DOCUMENTS 10,102,745 B2 * 10/2018 Tamura ................. G08G 1/0116
2016/0363935 A1 * 12/2016 Shuster .................. G08G 1/163
(Continued)

OTHER PUBLICATIONS

Meriam Webster Online Dictionary, Definition of Map, last accessed Feb. 2022 (Year: 2022).*

*Primary Examiner* — Aniss Chad
*Assistant Examiner* — Jennifer M Anda
(74) *Attorney, Agent, or Firm* — Perkins Coie LLP

(57) ABSTRACT

Examples of the present disclosure describe systems and methods for detecting and remediating roadway hazards. In example aspects, a machine learning model is trained on a dataset related to roadway items. Input data may then be collected by a data collection engine and provided to a pattern recognizer. The pattern recognizer may extract roadway features (physical and non-physical) and recognized patterns from the input data and provide the extracted features to a trained machine learning model. The trained machine learning model may compare the extracted features to the model, and a risk value may be generated. The risk value may be compared to a risk value threshold. If the risk value is equal to or exceeds the risk threshold, then the input data may be classified as a roadway hazard. Remedial action may subsequently be triggered, e.g., notifying other vehicles on the roadway, notifying other devices of drivers on the roadway, and/or notifying interested third parties (e.g., government agencies and/or private entities responsible for maintaining a roadway), to decrease the frequency of vehicles colliding with roadway hazards and to increase the efficiency of remediating the identified roadway hazards.

20 Claims, 9 Drawing Sheets

(56) References Cited

U.S. PATENT DOCUMENTS

| | | | | |
|---|---|---|---|---|
| 2017/0089710 A1* | 3/2017 | Slusar | ............... | G01C 21/3461 |
| 2019/0340924 A1* | 11/2019 | Abari | ............... | G08G 1/09623 |
| 2019/0382029 A1* | 12/2019 | Golov | ............... | G06V 10/82 |
| 2019/0389441 A1* | 12/2019 | Yamaguchi | ............ | G08G 1/166 |
| 2020/0074862 A1* | 3/2020 | Johnston | .............. | G05D 1/0088 |
| 2020/0250984 A1* | 8/2020 | Kundu | ............... | B60W 30/09 |
| 2021/0049908 A1* | 2/2021 | Pipe | ................... | G08G 1/0112 |

\* cited by examiner

WIRELESS VEHICULAR SYSTEMS AND METHODS FOR DETECTING ROADWAY CONDITIONS

TECHNICAL FIELD

The present disclosure is related to the field of intelligent vehicular systems. In particular, the present disclosure is directed at a vehicular system that is capable of detecting roadway conditions and communicating those conditions to other vehicles and/or devices. A vehicle may be equipped with various sensors to detect certain roadway conditions (e.g., pothole). Upon detecting certain roadway conditions, the vehicle may autonomously avoid a hazard in the road and/or communicate the location of the hazard to a device located inside the vehicle to alert the driver of the vehicle. Additionally, the location of the hazard may be communicated to a central hub (e.g., government agencies responsible for maintaining roadways) so that the hazard may be removed. The roadway conditions may be detected using a variety of sensors (e.g., LiDAR) and cameras. Application of detecting roadway conditions by intelligent vehicular systems decreases the frequency of vehicular damage when coming into contact with a hazard (e.g., hitting a pothole) and increases the ability for government agencies and/or companies to locate and remedy a hazard in a roadway.

BACKGROUND

Drivers of motor vehicles often deal with common roadway hazards and unsafe driving situations. Such hazards include but are not limited to poor weather and road conditions, bad traffic, reckless drivers, reckless pedestrians, bicyclists, road debris, vehicles hauling oversized loads, construction zones, potholes, and malfunctioning traffic lights. All of these hazards and situations create unsafe driving conditions. However, most drivers are not aware of these upcoming hazards and driving conditions. This increases the risk of the driver engaging an upcoming hazard, e.g., hitting a pothole. In autonomous vehicles, sensors may not be able to see far enough ahead on the roadway to cause the vehicle to avoid an upcoming hazard or make a detour to avoid poor driving conditions. Vehicles that consistently fail to avoid roadway hazards and poor driving conditions will deteriorate, and the driver and passengers riding in these vehicles are subject to an increased likelihood of hardship, injury, and even death. Many vehicles today are equipped with sensors capable of spotting a vehicle in a driver's blind spot or warning that the car is drifting out of a lane. Unfortunately, these technologies do not always account for real-time roadway conditions, and often, even if a vehicular sensor recognizes an upcoming roadway hazard, the vehicle position may prevent the vehicle from changing its course to avoid running into the hazard.

Further, government organizations and other third parties often struggle to locate and remove roadway hazards in a timely manner. Because of the delay in remedying these hazards, more drivers and passengers of vehicles are subject to hardship, injury, and even death. Costs of vehicle repairs (e.g., for striking a pothole that has not been fixed) also increase with the delay in removing the roadway hazards.

Thus, there is an increased need for systems and methods that can address the challenges of detecting and communicating poor roadway conditions to vehicles and drivers on the road.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
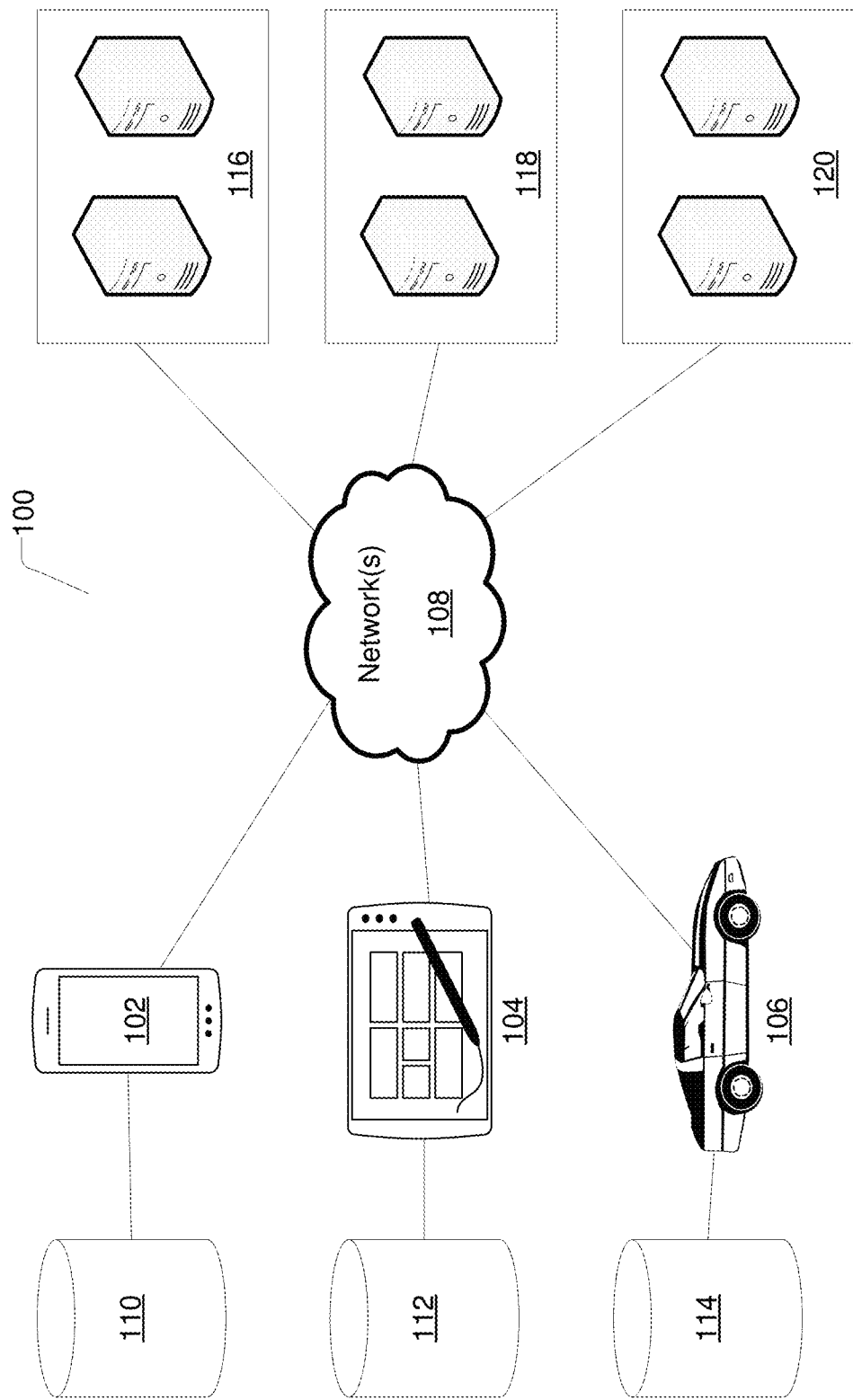
FIG. 1 illustrates an example of a distributed system for detecting and remediating roadway conditions.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with intelligent computer systems that detect and avoid hazardous roadway conditions. The systems and methods presented herein are also directed to informing drivers on the road about the hazardous roadway conditions, as well as informing entities responsible for removing and remediating the hazards on the roadway.

Roadway hazards are responsible for numerous injuries and deaths every year, as well as costing drivers billions of dollars in vehicular damage. Some of the most common roadway hazards include, but are not limited to, potholes, weather elements (e.g., black ice), cracks, roadside obstacles (e.g., cones, parked cars), debris (e.g., that fell from the back of a truck), malfunctioning traffic lights, reckless drivers, pedestrians, and bicyclists. Most of the time, drivers are not aware of the roadway hazards approaching, and because drivers are typically unaware of the impending roadway hazards, they are unable to respond quickly enough to avoid colliding with the roadway hazard. Furthermore, government agencies and private entities responsible for maintaining roads are often not promptly notified of roadway hazards, leaving most roadway hazards unattended to for long periods of time, resulting in increased vehicular damage and increased injuries and death to drivers and passengers.

As such, there is a need for real-time detection and notification of roadway hazards. An autonomous vehicle that is equipped with various sensors may be able to detect an upcoming roadway hazard and take corrective action based on environmental factors to avoid colliding with the roadway hazard. In some embodiments, the data captured by an autonomous vehicle may be transmitted to a third-party government agency, insurance company, or private entity to notify them of the roadway hazard and its location. In other embodiments, the roadway hazard data may be transmitted to other drivers and vehicles on the road. For example, a second autonomous vehicle may receive roadway hazard data from a first autonomous vehicle, prompting the second autonomous vehicle to take a different road to its final destination so that it avoids any chance of colliding with the roadway hazard. In yet other embodiments, roadway hazard data may be transmitted to mobile devices of drivers in non-autonomous vehicles, alerting them to the severity and location of upcoming roadway hazards.

In some embodiments, detecting roadway hazards may be achieved through implementing one or more machine learning algorithms. As more roadway hazards are identified by certain vehicular sensors over time, the more accurate future identifications of roadway hazards may be. The present disclosure describes systems and methods for implementing a machine-learning based roadway hazard detection and notification system. The machine-learning model is trained on various, identified roadway hazards. Various characteristics of the roadway hazards may be extracted and identified by a pattern recognizer, and the identified and extracted features may then be provided to the machine-learning model. For example, the three-dimensional placement of the roadway hazard may be extracted to determine if the roadway hazard is a pothole (below the roadway axis) or debris (above the roadway axis). In other aspects, a roadway hazard may be identified by vehicular information from a vehicle collision with the roadway hazard. For example, sudden changes in the vehicle's gyroscope or axle angles may indicate that the vehicle has struck a pothole (e.g., as recorded using a G-sensor). Other indicators may also include but are not limited to sudden changes in tire pressure or suspension damage. Sudden braking may also indicate the existence of a roadway hazard. In some aspects, the pattern recognizer may identify certain features of the roadway hazards and aggregate the identified features to determine a recognized pattern. Once the machine-learning model is trained, candidate roadway items may be obtained (e.g., from vehicular sensors) and compared against the machine-learning model. A risk value may be generated based on the comparison of the candidate roadway items to the machine-learning model. If the risk value exceeds a risk threshold, the candidate roadway items may be deemed to be hazards, and a remedial action may be deployed.

The techniques disclosed herein increase the speed of detecting, notifying, and remediating roadway hazards as compared to traditional methods of manually contacting an associated government municipality via phone or email and imprecisely describing the location and nature of the alleged roadway hazard. The increased speed of detection and remediation of roadway hazards is attributed to the use of a network architecture that immediately notifies other vehicles and drivers on the road, as well as government agencies and third party entities responsible for maintaining roadways. The increased speed of detection and remediation can also be attributed to the use of a machine-learning model and risk threshold. Rather than speculate as to whether a certain roadway item is a hazard or not, the disclosed machine-learning based roadway hazard detection system can detect the roadway hazard based on recognized patterns and a risk threshold. For example, the machine-learning model may be trained on a standard pothole. Various visual features, such as the circumference shape, diameter, and depth, may be extracted and identified during the training of the machine-learning model. The visual features of the pothole may be aggregated by the pattern recognizer to establish a recognized pattern associated with standard potholes. When a new pothole appears on a roadway, currently available techniques require the driver to report the pothole to the associated authority. In more advanced vehicles (e.g., autonomous vehicles), currently available techniques may cause the vehicle to detect the upcoming pothole and attempt to avoid it, but other vehicles and drivers on the road are not notified of the pothole. Conversely, the roadway hazard detection system disclosed herein is able to identify roadway hazards and immediately notify other drivers and vehicles on the road, as well as government agencies and third-party entities responsible for maintaining the roadways. The disclosed roadway hazard detection system is able to detect newly-formed potholes (and other roadway hazards), even though the machine-learning model may not have been trained on the newly-formed pothole. The roadway hazard detection system is able to detect a newly-formed pothole because the new pothole may have similar visual features (e.g., diameter, depth, etc.) and contain similar recognized patterns as the previously identified potholes on which the machine-learning model was trained. As such, the roadway hazard detection system will determine if the visual features of the newly-formed pothole exceed a risk threshold. If the threshold is exceeded, a roadway hazard descriptor may be assigned to that pothole and remedial action may be triggered, such as by automatically notifying other nearby drivers and vehicles of the roadway hazard and/or by automatically notifying the appropriate government agency or third-party entity responsible for maintaining the particular roadway on which the hazard was detected.

Accordingly, the present disclosure provides a plurality of benefits including but not limited to: enabling more accurate and frequent detection of roadway hazards, which decreases vehicular damage and bodily injury to drivers and passengers; determining the existence of a roadway hazard without manually notifying via phone and/or email the appropriate government agency or third-party entity responsible for maintaining the particular roadway; enabling nearby vehicles and mobile devices to receive real-time notifications of roadway hazard locations and severity; and improving the quality of roadways by efficiently locating and remediating roadway hazards, among other examples.

FIG. 1 illustrates an example of a distributed system for detecting and remediating roadway hazards. Example system 100 presented is a combination of interdependent components that interact to form an integrated whole for detection and remediation of roadway hazards. Components of the system may be hardware components or software implemented on, and/or executed by, hardware components of the systems. For example, system 100 comprises client devices 102 and 104, vehicular device 106, local databases 110, 112, vehicular database 114, network(s) 108, and server devices 116, 118, and/or 120.

Client devices 102 and 104 and vehicular device 106 may be configured to receive data related to an outside environment and communicate with other client devices and vehicular devices. In aspects, a client device and/or a vehicular device, such as devices 102, 104, and 106, may have access to one or more data sources comprising data related to roadway items. The data sources may be local to, or external to, the client devices and/or vehicular device. The data related to roadway items may include, for example, video files, image files, text files, application documents, and the like. As another example, the client device and/or vehicular device may execute a live feed application or service that captures real-time images and videos of an external environment and transmits the captured content to one or more remote web servers or external data storage locations, such as server devices 116, 118, and/or 120. The client devices and/or vehicular device may be equipped with various cameras and sensors that are capable of capturing images and videos in real-time.

In some aspects, the data that is captured by the various cameras and sensors affixed to the client devices and vehicular device(s) may be provided to one or more machine-learning (ML) models. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In an example, the ML models may be located on the client device, vehicular device, a server device, a network appliance (e.g., a firewall, a router, etc.), or some combination thereof. The ML models may process the data to determine whether the data comprises a roadway hazard. Roadway hazard, as used herein, may refer to roadway deterioration (e.g., potholes), weather-related hazards (e.g., black ice), traffic hazards (e.g., malfunctioning traffic lights, crowded roadways), pedestrian hazards, bicycle hazards, roadway debris, and other similar roadway hazards. Determining whether the roadway data received from the client devices and vehicular device indicates a roadway hazard may comprise identifying various physical characteristics of the roadway items against a previously identified set of roadway items. In examples, when the identified features are determined to exceed a similarity threshold (e.g., the identified physical features of the roadway item(s) are sufficiently similar to the previously identified set of physical features), the roadway data may be classified as a roadway hazard. Based on the classification, the client device, vehicular device, and/or server device may perform (or cause the performance of) one or more actions.

In some aspects, features of the roadway data may be used to train the one or more ML models. For example, a set of labeled and/or unlabeled data may be used to train an ML model to identify roadway items that are sufficiently similar to the data used to train the model. The training may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to a server device may be configured to be used by the client device and/or vehicular device when, for example, the client device and/or vehicular device is connected to the Internet. Conversely, the ML model deployed to the client device may be configured to be used by the client device and/or vehicular device when, for example, the client device and/or vehicular device is not connected to the Internet. In such an example, the ML model may be locally cached by the client device and/or vehicular device.

Figure 2:
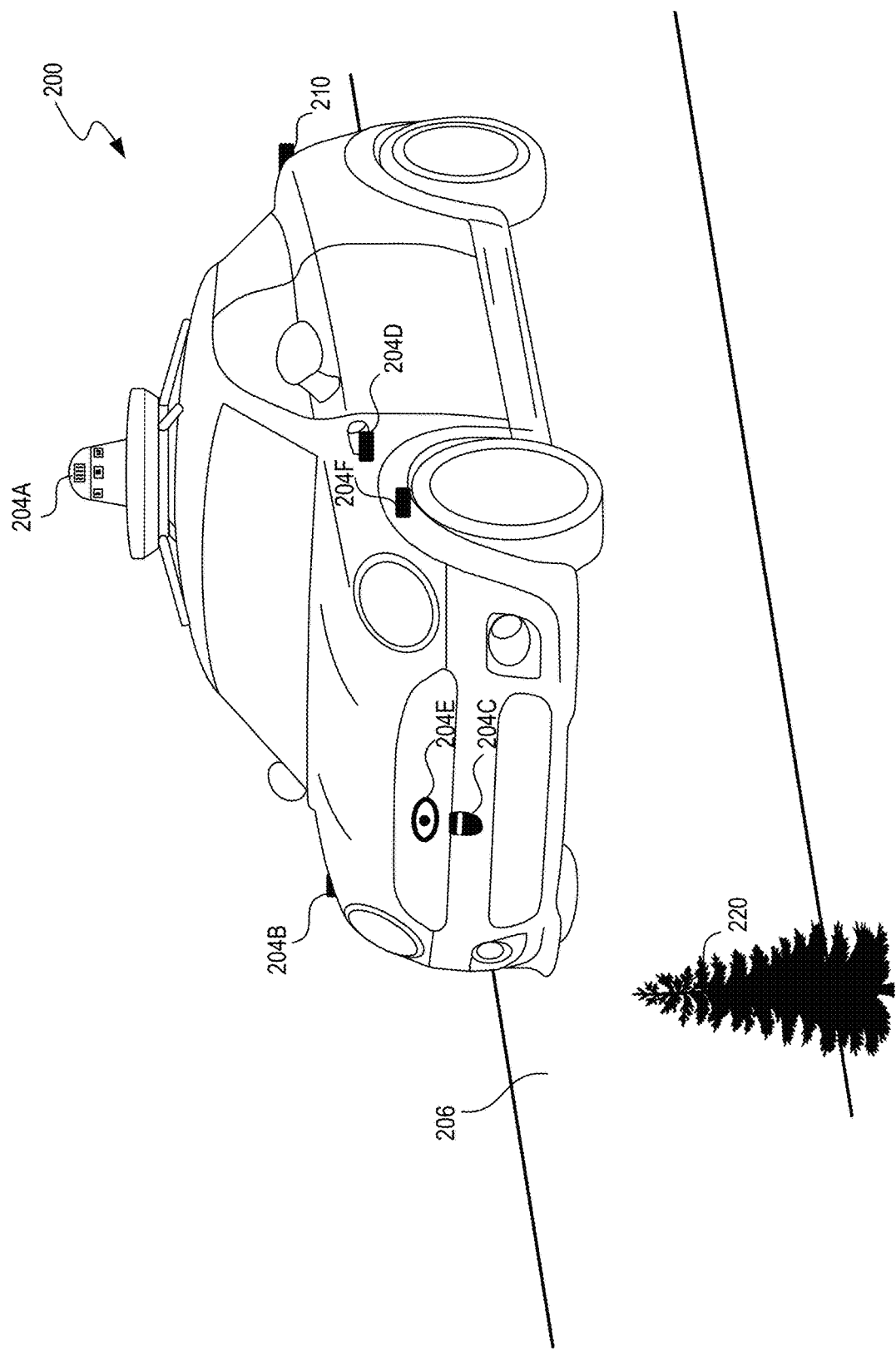
FIG. 2 illustrates an example of a car fitted with multiple sensors.

FIG. 2 illustrates an example vehicle (e.g., vehicle 200) fitted with multiple sensors traveling on roadway 206. For example, FIG. 2 shows vehicle 200 coupled with sensors 204A, 204B, 204C, 204D, 204E, and 204F. Sensors 204A, 204B, 204C, 204D, 204E, and 204F can of the same or different types. There is no limitation on the number or the type of sensor(s) that can be coupled to a vehicle. For example, sensor 204A and 204E can be LiDAR units that spin continuously. Using laser beams emitted form a LiDAR unit, the LiDAR unit can generate a 360-degree image of the surroundings of vehicle 200. The image can be a map of one or more objects (e.g., object 220) within a suitable vicinity of vehicle 200. Sensors 204B, 204D, and 204F can be radar units (ultrasonic or otherwise), which can measure distance between vehicle 200 and other objects or vehicles on roadway 206. In some embodiments, one or more camera units can be attached to the top of vehicle 200, e.g., adjacent to sensor 204A. Cameras can also help detect objects or vehicles on roadway 206, or in some scenarios, the edge, end of lane, or a shoulder of roadway 206. Cameras can also capture environmental features during severe weather conditions such as fog, rain, and snow. In some embodiments, any of sensors 204A, 204B, 204C, 204D, 204E, and 204F can be a GPS unit capable of determining a current location of vehicle 200. In some embodiments, cameras can include multiple lenses of differing focal lengths—wide angle, standard and long distance—to view roadway 206. Further, cameras can be forward-facing and/or backward-facing. Also, blind-spot detection and lane-departure warning subsystems included in the vehicular computer can use any of sensors/cameras 204A, 204B, 204C, 204D, 204E, and 204F.

Data from one or more sensors are collected and analyzed at the vehicular computer 210. For example, a map generated by the LiDAR unit(s), radar unit(s), and/or cameras can be integrated with information received form a GPS unit for vehicle 200 to determine "its bearings in the world in real time." Radar units transmit radio waves to an object and interpret the reflection back from the object under different weather and light conditions. In some embodiments, any of sensors/cameras 204A, 204B, 204C, 204D, 204E, and 204F can detect the presence of structural artifacts or roadway deformities on a portion of roadway 206, based on monitoring the portion of roadway 206.

In addition to the sensors/cameras 204A, 204B, 204C, 204D, 204E, and 204F, vehicle 200 may be fitted with various G-sensors (e.g., on each wheel). The G-sensor(s) may be configured to respond to sudden vehicular movements and/or impacts. For example, if vehicle 200 struck a hazard in a roadway, the G-sensor(s) may record data associated with the impact. The impact data may be used to determine that the hazard was a pothole, and the system described herein may mark the GPS location of the pothole and transmit the data associated with the pothole to proximal vehicles and drivers so that they avoid colliding with the pothole. Additionally, the location and nature of the pothole may be communicated to a third party responsible for maintaining the roadways (e.g., government agency, private roadwork company, etc.).

Figure 3:
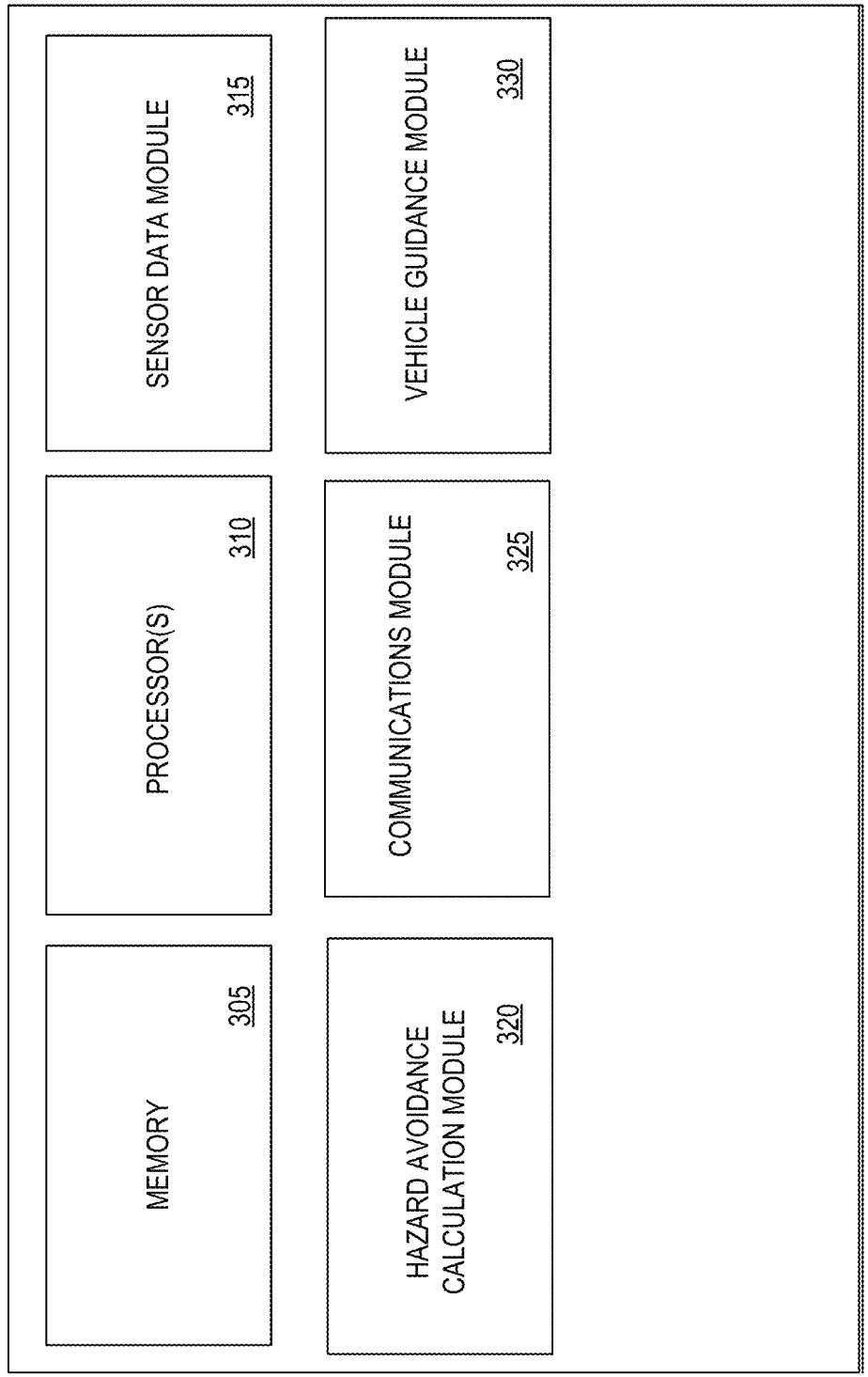
FIG. 3 illustrates an example architecture of a vehicular computer according to some embodiments of the disclosed technology.

FIG. 3 illustrates an example architecture of a vehicular computer according to some embodiments of the disclosed technology. The vehicular computer (e.g., one or more data processors) is capable of executing algorithms, software routines, and/or instructions based on processing data provided by a variety of sources related to the control of the vehicle and the external environment of the vehicle. The vehicular computer can be a factory-fitted system or an add-on unit retrofitted into a vehicle. Furthermore, the vehicular computer can be a general-purpose computer or a dedicated, special-purpose computer. No limitations are imposed on the location of the vehicular computer relative to the vehicle. According to the embodiments shown in FIG. 3, the disclosed system can include memory 305, one or more processors 310, sensor data module 315, hazard avoidance calculation module 320, communications module 325, and vehicle guidance module 330. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 305 can store instructions for running one or more applications or modules on processor(s) 310. For example, memory 305 could be used in one or more embodiments to house all or some of the instructions needed to execute the functionality of sensor data module 315, hazard avoidance calculation module 320, communications module 325, and vehicle guidance module 330. Generally, memory 305 can include any device, mechanism, or populated data structure used for storing information. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305.

Sensor data module 315 receives information from and transmits information to multiple sensors coupled to the vehicle. Examples of sensors can be video cameras, still cameras, LiDAR units, radar units, GPS units, speed sensors, acceleration sensors, environmental sensors such as temperature/weather sensors for sensing ambient weather, operational data associated with one or more vehicle parts such as a tire, radiation sensors for detecting chemicals in the air, or otherwise any suitable sensors couple to the vehicle. Sensors can be attached anywhere in the vehicle, e.g., to the top, to the rear, on the sides, underneath, on or inside at least one tire of the vehicle, or any other suitable position inside or outside the vehicle. Also, sensors can be of different types and from different manufacturers or vendors. Data from sensors can be utilized to calculate relative distance data to one or more nearby objects/obstacles on the roadway. Examples of objects can be a pedestrian, other vehicles, a traffic light, a sidewalk, a shoulder of a road, a billboard, a speed post, a traffic sign, a pothole or other roadway deformity, road debris, or otherwise any physical object that can be detected by sensors. In some embodiments, the vehicular computer can self-generate a map based on data communicated by sensor data module 315, showing locations of structural artifacts in the roadway (e.g., ruts, potholes, etc.) and/or locations of objects (e.g., roadway debris, pedestrians, traffic lights, other vehicles, shoulder of roadway, etc.).

Hazard avoidance calculation module 320 is configured to receive information from sensor data module 315 and/or external sources to calculate a driving path relative to the current position of the vehicle and an upcoming roadway hazard. The received information can be based on one or more factors such as the location information of the structural artifacts/deformities in the roadway (e.g., ruts, potholes, etc.), the instantaneous position of objects located on the portion of the roadway, operational data associated with the vehicle, and the environmental data external to the vehicle. The operational data can be (or, related to) a speed of travel of at least one tire, an acceleration of the at least one tire, a direction of travel of the at least one tire, a vehicular weight on the at least one tire, and a frictional force of the roadway impacting the at least one tire. In some embodiments, the driving path has a value and a direction, e.g., relative to a current position of the vehicle and/or relative to a detected roadway hazard.

Communications module 325 is associated with sending/receiving information (e.g., collected by sensor data module 315) with a remote server or with one or more nearby vehicles traveling on the road. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 325 sends information collected by sensor data module 315.

Vehicle guidance module 330 is associated with the functionality of driving the vehicle on the roadway, including modifying the driving path of the vehicle to generate a new position of the vehicle, based on information received from sensor data module 315, hazard avoidance calculation module 320, and communications module 325. In some embodiments, vehicle guidance module 330 can predict an expected outcome of impact between the vehicle and a roadway item (e.g., structural artifact/deformity); calculate a probability of the expected outcome of impact between the vehicle and a roadway item and also determine that the probability is greater than a threshold value. Vehicle guidance module 330 can employ one or more machine learning algorithms such as artificial intelligence, neural networks, Tensor Flow, or any other suitable methodology to generate a new position of the vehicle.

Figure 4:
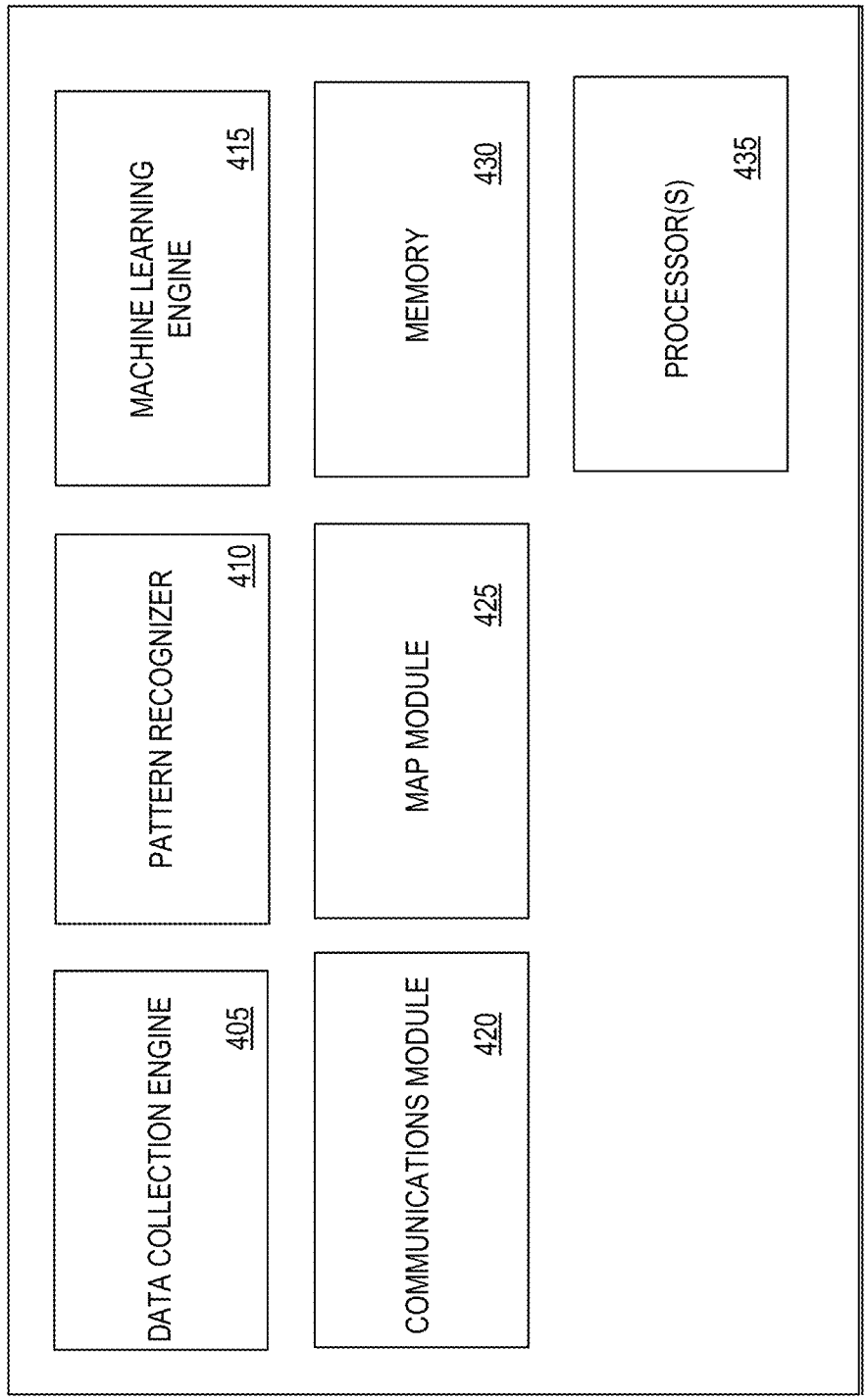
FIG. 4 illustrates an example architecture of a remote computer according to some embodiments of the disclosed technology.

FIG. 4 illustrates an example architecture of a remote computer according to some embodiments of the disclosed technology. Referring to FIG. 4, an example internal architecture of a remote server (or, servers) is shown, according to some embodiments of the disclosed technology. According to the embodiments shown in FIG. 4, the disclosed system can include data collection engine 405, pattern recognizer 410, machine learning engine 415, communications module 420, map module 425, memory 430, and one or more processors 435. Memory 430 and processors(s) 435 are similar to memory 305 and processor(s) 310 discussed in connection with FIG. 3.

Data collection engine 405 may be configured to collect account and device information, along with environmental information collected through various vehicular sensors and cameras, as described in FIG. 2. In aspects, the remote computer may detect, or otherwise be informed of, devices (e.g., client devices, vehicular devices, network appliance devices, etc.) that have connected to the remote computer or a network thereof. The remote computer may collect and/or store information related to the detected/connected devices and/or the corresponding environmental information and users. Data collection engine 405 may have access to the information collected/stored and may collect or aggregate at least a portion of the collected/stored information. For example, candidate roadway items may be collected and stored by the data collection engine 405. Alternately, data collection engine 405 may interrogate, or otherwise solicit data from, one or more data sources comprising such information. For example, data collection engine 405 may have access to data in one or more external systems, such as vehicular systems, environmental data collection systems, user profiles or preference settings, authentication/authorization systems, device manifests, or the like. Data collection engine 405 may use a set of APIs or similar interfaces to communicate requests to, and receive response data from, such data sources. In at least one example, the data collection process of data collection engine 405 may be triggered according to a present schedule, in response to a specific user request to collect data, or in response to the satisfaction of one or more criteria (e.g., a vehicle alignment sensor records an abnormal reading due to impact with a pothole).

Pattern recognizer 410 may be configured to identify and extract various physical features of the captured data of roadway items to create recognized patterns. In some aspects, the captured data may be in the form of a still image captured by high-resolution cameras or three-dimensional images created using one or more LiDAR sensors. Within these images, particular roadway items may be identified. In aspects, pattern recognizer 410 may have access to data collected by data collection engine 405. Pattern recognizer 410 may perform one or more processing operations on the collected data. The processing operations may include organizing the collected data into one or more groups (e.g., a features or objects vector) and/or sorting the data according to one or more criteria (e.g., physical features, weather data, vehicular information, etc.). The processing operations may additionally include separating certain physical features, such as separating the dimensions of a roadway item from the colors and/or texture of the roadway item. To extract these physical features and separate them accordingly, pattern recognizer 410 may utilize pixel recognition algorithms, object extraction techniques, and convolutional neural networks. In one aspect, pattern recognizer 410 may extract a structural deformity in the roadway from an optical image captured of the external vehicle environment, where the structural deformity may comprise the shape, outlines, dimensions, and textures of a pothole, among other visual data. In another aspect, pattern recognizer 410 may identify and extract color schemes and environment layouts from the collected data of data collection engine 405. In at least one example, the identified and extracted physical features may be accessible to data collection engine 405 during the data collection process described above. In yet further examples, the pattern recognizer 410 may be configured to aggregate the extracted features into a features vector that defines an established pattern. For example, pattern recognizer 410 may extract ten features from a particular pothole. Five of those features may be physical features, such as depth of the pothole below the roadway axis, the circumference of the pothole, the diameter of the pothole, whether the pothole is dry or contains water, etc. Five of those features may also be non-physical features, such as vehicular data, outside ambient air temperature, GPS location information, etc. For example, vehicular data may include sudden changes to a vehicle's gyroscope or axle angle due to structural deformities in the road, indicating the existence of a roadway hazard. In other aspects, vehicular data could comprise of sudden braking, indicating the existence of an upcoming roadway hazard. The combination of the ten physical and non-physical features may comprise a features vector that defines a recognized pattern. The recognized pattern may then be used to train a machine learning model (using a machine learning engine 415) that will be compared against newer roadway items that include potholes and other structural deformities. The comparison results may determine whether or not the newly received roadway items are roadway hazards.

Machine learning engine 415 may be configured to receive the identified and extracted features and patterns from pattern recognizer 410. Machine learning engine 415 may also be configured with at least one machine learning model. In some aspects, the features received from pattern recognizer 410 may be used to train at least one machine learning model in the machine learning engine 415. For example, to train the machine learning model, the extracted features may be associated with specific identifiers, such as depth, circumference, texture, GPS location, time identified, and other identifiers of the extracted features. Machine learning engine 415 may utilize various machine learning algorithms to train the machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. The aforementioned machine learning algorithms may also be applied when comparing input data to an already-trained machine learning model. Based on the identified and extracted features and patterns, machine learning engine 415 may select the appropriate machine learning algorithm to apply to the features to train the at least one machine learning model. For example, if the received features are complex and demonstrate non-linear relationships, then machine learning engine 415 may select a bagging and random forest algorithm to train the machine learning model. However, if the features demonstrate a linear relationship, then machine learning engine 415 may apply a linear or logistic regression algorithm to train the machine learning model.

In other aspects, machine learning engine 415 may apply at least one already-trained machine learning model to the received features and patterns to detect previously identified and extracted features and previously recognized patterns. Machine learning engine 415 may be configured to compare at least one trained machine learning model to the received features to generate comparison results that indicate whether the received features indicate a roadway hazard. Specifically, machine learning engine 415 may compare the identified and extracted features of the received roadway item to at least one model trained on previously received roadway items that are associated with specific roadway hazard identifiers. Machine learning engine 415 is also configured to generate comparison results, indicating the similarity (or lack thereof) between certain roadway items on which the machine learning model was trained and the received features from pattern recognizer 410. In other aspects, the comparison results may include a data object risk indicator that a certain data object is present in the input data. For instance, the comparison results may generate a data object risk indicator that a specific depth dimension, texture characteristic, and/or GPS location is present in the extracted features and/or patterns. The comparison results may include data object risk indicator information regarding identified data objects in the features and/or patterns. The data object risk information may then be used in determining the overall risk value, which may indicate whether a certain roadway item should be classified as a roadway hazard.

In other embodiments, the disclosed system may be designed in a multi-state configuration and include more than one machine learning engine 415. In such embodiments, a first machine learning engine may be trained to recognize one type of roadway entity (e.g., dimensions of roadway items, colors of roadway items, locations of roadway items, etc.) and a second machine learning engine may be trained to recognize another type of roadway entity. For example, one machine learning engine may be trained on specific types of dimensions of roadway items (e.g., standard depth, circumference, and diameters of potholes), and another machine learning engine may be trained on specific types of internal vehicular sensor data (e.g., the gyroscope, tire pressure, and axle angle fluctuations a vehicle experiences when striking a pothole). In other aspects, multiple machine learning engines may be distributed within the disclosed system. A multi-state configuration allows for multiple machine learning engines to process data simultaneously, thereby increasing processing power and speed, which may translate to more accurate roadway hazard determinations of the input data. The comparison results generated by each machine learning engine may be aggregated prior to rendering a risk value. A risk value may be generated based on the comparison of the candidate roadway items to the machine-learning model. If the risk value exceeds a risk threshold, the candidate roadway items may be deemed to be hazards, and a remedial action may be deployed (e.g., causing an autonomous vehicle to change course, notifying other drivers and vehicle on the road of the location and nature of the roadway hazard, notifying the appropriate government agency and/or third-party entity responsible for maintaining the roadway of the location and severity of the roadway hazard, etc.). The risk value information may be communicated to Communications Module 420 and shared with other vehicles and drivers on the roadway, as well as with government agencies and third-party entities responsible for maintaining the roadway.

Communications module 420 is configured to receive data from machine learning engine 415. Communications module 420 may exchange this data (e.g., classifying certain roadway items as hazards or not) with geocoding databases such as Google, vehicular computers of vehicles moving on roadways, client devices (e.g., mobile phones and tablets), and/or other servers. In some embodiments, communications module 420 can use an application programming interface (API) to exchange information with various remote servers.

Map module 425 can be configured to create a map of roadway hazards based on information received from communications module 420. In some embodiments, information received from communications module 420 can include information about traffic density, alternative routes, and other roadway-related data. The map can be communicated to vehicles on the road and client devices (e.g., mobile phones and tablets) in real-time by communications module 420.

Figure 5:
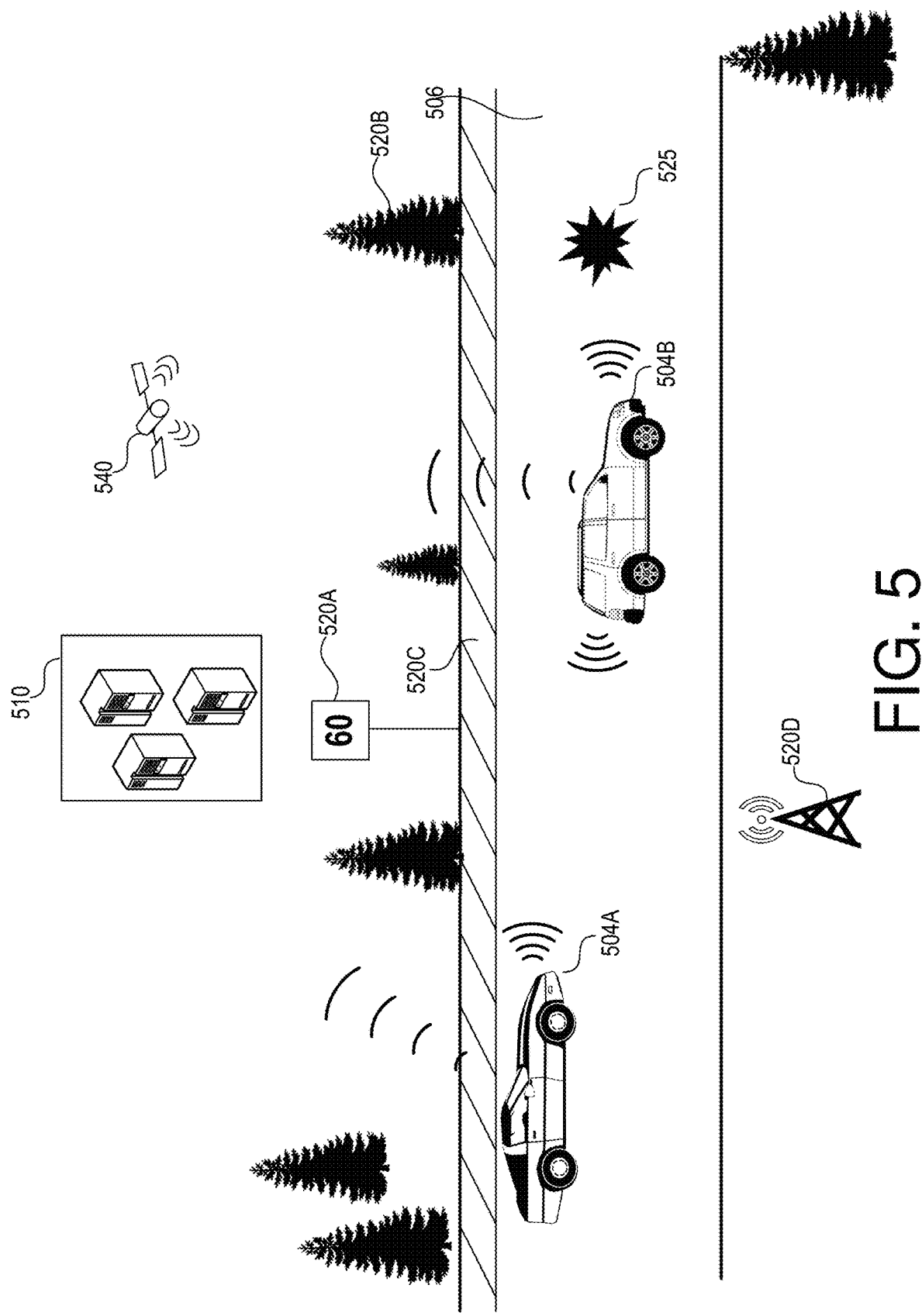
FIG. 5 illustrates an example environment of operation of the disclosed technology.

FIG. 5 illustrates an example scenario of operation of the disclosed technology. Cars 504A and 504B are traveling on a portion of roadway 506. Car 504B is approaching a roadway hazard 525. Car 504B may identify and recognize the roadway hazard ahead (e.g., using cameras or LiDAR sensors equipped to the vehicle, as described in FIG. 2), and a remedial action may be triggered, causing car 504B to change its driving path to avoid impact with roadway hazard 525. In other aspects, car 504B may not recognize the upcoming roadway hazard 525 and strike the hazard 525. The internal vehicular data collected from striking the hazard 525 may include fluctuations in the vehicle's gyroscope and changes in the axle angles. Such data points may indicate the existence of a roadway hazard, such as hazard 525. Based on the collected data from car 504B, car 504B may communicate the existence, location, and severity of the roadway hazard 525 to car 504A so that car 504A may avoid impact with roadway hazard 525.

Cars 504A and 504B can be equipped with multiple sensors that allow them to communicate with one another. For example, the data regarding the roadway hazard 525 that was received by the sensors on car 504B may be communicated to car 504A, so that car 504A may change its driving path to avoid impact with roadway hazard 525. Furthermore, cars 504A and 504B can communicate with one or more remote servers 510 and/or satellite 540 via sensors coupled to cars 504A and 504B. Objects 520A, 520B, 520C, and 520D are located/positioned on the portion of roadway 506. Object 520D is a communication tower. Communications between cars 504A and 504B or between remote servers 510 and a vehicle (e.g., car 504A) can employ any suitable type of wireless technology, such as Bluetooth, WiFi, WiMax, cellular, single hop communication, multi-hop communication, Dedicated Short Range Communications (DSRC), or a proprietary communication protocol. Cars 504A and 504B can obtain their geographical positions on roadway 506 with the help of GPS information from satellite 540. Further, cars 504A and 504B can change driving paths based on GPS information received from satellite 540.

In other examples, object 520A may be an electronic speed limit sign equipped with sensors that allow object 520A to communicate directly with vehicles on the road (e.g., via sensors coupled to cars 504A and 504B) and/or communicate with one or more remote servers 510 and/or satellite 540. Based on the collected data from car 504B, car 504B may not only communicate the existence, location, and severity of roadway hazard 525 to car 504A, but also to object 520A. Upon receiving communications from car 504B relating to roadway hazard 525, object 520A may update its displayed speed limit in real-time (e.g., the speed limit may be lowered according to the location and severity of roadway hazard 525). In other examples, object 520A may receive information related to the existence, location, and severity of roadway hazard 525 from remote servers 510 and/or satellite 540. Object 520A may be configured to communicate via any suitable type of wireless technology, such as Bluetooth, WiFi, WiMax, cellular, single hop communication, multi-hop communication, Dedicated Short Range Communications (DSRC), or a proprietary communication protocol.

In some embodiments, car 504B can communicate information about roadway hazard 525 to server 510 and/or car 504A. Car 504A can also communicate its geographical location, e.g., obtained using data collected from sensors coupled to car 504B. In some embodiments, server 510 can communicate information about the roadway hazard 525 to each vehicle or other vehicles on roadway 506. Thus, according to disclosed embodiments, information about roadway hazards can be determined by a car or vehicle itself, e.g., using sensors coupled to the car. Although FIG. 5 shows a scenario with two cars 504A and 504B, embodiments of the disclosed technology can be applicable in scenarios with any number or types of cars. In some embodiments, roadway hazard information collected from car 504B can be communicated to server 510 which then broadcasts the roadway hazard information to vehicles operating on roadway 506 and proximal to car 504B (e.g., car 504A), as well as interested third parties (e.g., government agencies and/or private companies responsible for maintaining roadway 506). Additionally, roadway hazard information can be communicated from server 510 to mobile devices (e.g., mobile phone, tablet, etc.) of drivers operating vehicles on roadway 506. Specifically, in the example of a non-autonomous vehicle that is not equipped with sensors and cameras, the driver of the non-autonomous vehicle may still be able to avoid impact with roadway hazard 525 by taking manual corrective action based on the roadway hazard information received on the driver's mobile device. Thus, in some embodiments, vehicles on the roadway and client devices of drivers on the roadway receive periodic or intermittent updates from server 510 with information about upcoming roadway hazards collected by other proximal vehicles and drivers on the roadway.

Figure 6:
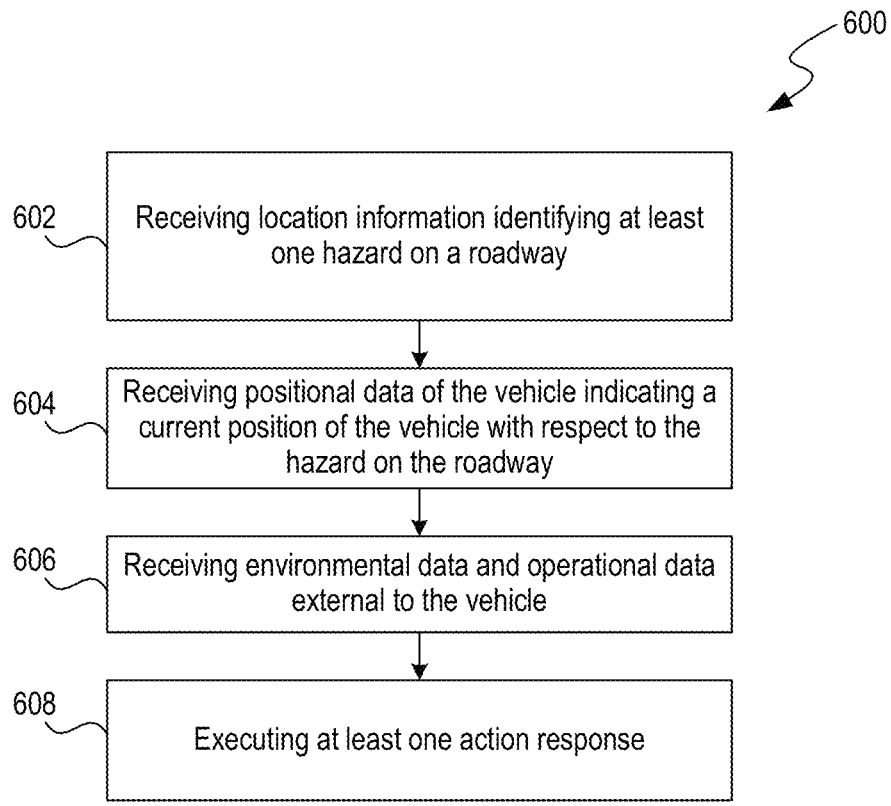
FIG. 6 illustrates an example method for detecting and responding to at least one roadway condition

FIG. 6 illustrates an example method 600 for detecting and responding to at least one roadway condition according to some embodiments of the disclosed technology. Starting at step 602, the device (e.g., vehicular computer and/or client device) receives (e.g., from one or more sensors coupled to the vehicle or a remote server) location and descriptive information identifying roadway hazards (such as ruts, potholes, bumps, dips, pedestrians, weather, stopped vehicles, etc.) On a surface of a portion of the roadway and/or instantaneous position of objects located on the portion of the roadway. At step 604, the device receives (e.g., from one or more sensors coupled to the vehicle or a remote server) positional data of the device indicating a current position of the device with respect to the roadway and the upcoming roadway hazard. At step 606, environmental data external to the device is received (e.g., from a sensor coupled to the vehicle), as well as operational data of the vehicle. Examples of sensors can be video cameras, still cameras, lidar units, radar units, gps units, speed sensors, acceleration sensors, environmental sensors such as temperature/weather sensors for sensing ambient weather, operational data associated with one or more vehicle parts such as a tire, infrared, or thermal cameras, radiation sensors for detecting chemicals in the air, or otherwise any suitable sensors coupled to the vehicle. Sensors can be attached anywhere in the vehicle, e.g., to the top, to the rear, on the sides, underneath, on or inside at least one tire of the vehicle, or any other suitable position inside or outside the vehicle. Also, sensors can be of different types and from different manufacturers or vendors. In some embodiments, the disclosed vehicular computer can self-generate a map based on data communicated by showing locations of roadway hazards (e.g., potholes, road debris, stopped cars, pedestrians, malfunctioning traffic lights, etc.) And/or locations of roadway objects (e.g., traffic lights, stop signs, shoulders of roadway, etc.). In some embodiments, the positional data of the device (vehicular computer and/or mobile device) indicating a current position of the vehicle is obtained based on a comparison of (i) the operational data associated with the at least one tire with (ii) factory-determined parameters corresponding to the at least one tire specified under conditions of the external environmental data (collected by sensors coupled to the vehicle). Factory-determined parameters may be locally stored data provided by a manufacturer, a mechanic, a user, an owner, and/or other entity having specifications and/or measurements for the physical dimensions of the vehicle and corresponding to a given set of environmental data.

Operational data received at step 606 may include, but is not limited to, speed indications, gyroscope fluctuations, axle angles, braking activity, and fuel usage. In some aspects, a roadway hazard may not be correctly identified based on external sensors alone (e.g., LiDAR and/or cameras). In such scenarios, a vehicle may strike the roadway hazard, causing a sudden change in operational data of the vehicle (e.g., sudden changes in the vehicle's gyroscope). Such sudden changes in operational data may be used in combination with the environmental data external to the vehicle to determine the existence of a roadway hazard. Information related to the location and severity of the roadway hazard may be subsequently transmitted to other vehicles and drivers on the road so that they may avoid colliding with the roadway hazard.

At step 608, at least one action response is executed. For example, if a roadway hazard has been identified before the vehicle collides with the roadway hazard, the device calculates an avoidance path based on the current position of the vehicle, location of the roadway hazard, and/or received environmental data (e.g., location of surrounding traffic). The path of the vehicle is modified according to the calculated avoidance path. The avoidance path can be executed autonomously by the vehicle in some examples. In other aspects, the avoidance path is calculated and displayed on a mobile device of a driver of a vehicle, wherein the driver of the vehicle may need to take manual corrective action in accordance with the avoidance path displayed on the driver's mobile device. In other aspects, the at least one action response may be executed after a vehicle collides with an unidentified roadway hazard (e.g., pothole). Upon colliding with a roadway hazard, the vehicle may collect data (e.g., via a G-sensor) that records data associated with sudden braking, sudden speed changes, unusual axle positions, and increased load bearing on one side of the vehicle, among other collected datapoints. This data may be analyzed in conjunction with the position data collected at operation 604 and the environmental data collected at operation 606 to determine that the roadway hazard was a pothole. The GPS location and nature of the roadway hazard may then be communicated (e.g., via a wireless 5G network) to other vehicles in proximity to the roadway hazard, warning the vehicles and their drivers of the hazard. As a result, more vehicles will avoid colliding with certain roadway hazards, thereby decreasing vehicular damage and injury/death to drivers and passengers.

Figure 7:
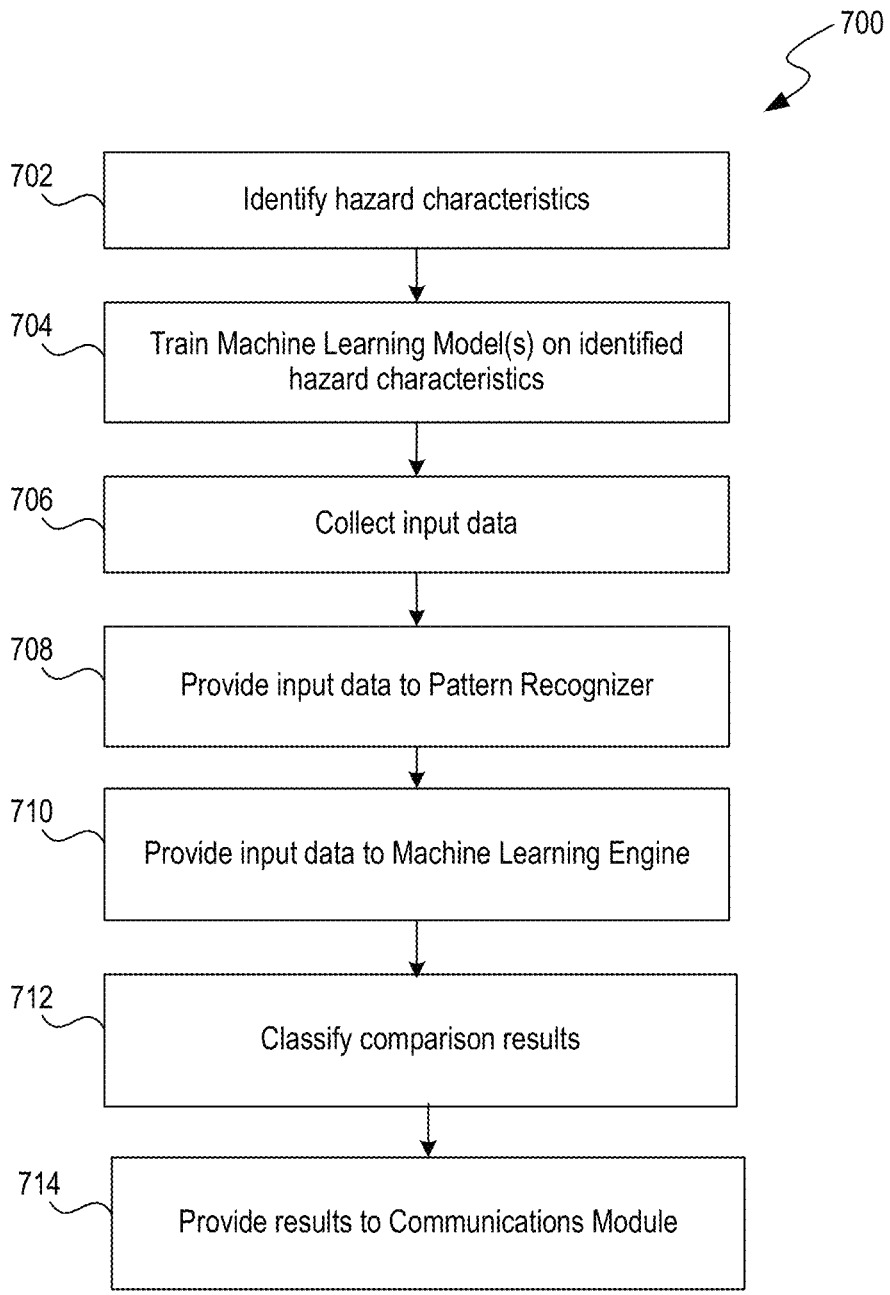
FIG. 7 illustrates an example method for recognizing patterns in roadway conditions.

FIG. 7 illustrates an example method for recognizing patterns in roadway conditions according to some embodiments of the disclosed technology. Method 700 begins at operation 702 where roadway hazard characteristics are identified and extracted. Roadway hazard characteristics may include both physical and non-physical features. Physical features include but are not limited to dimensions, shapes, outlines, colors, textures, and size. In some aspects, physical features may include weight and object identification (e.g., road debris that fell from the back of a truck). Non-physical features may include but are not limited to ambient air temperature, weather forecasts, GPS location, roadway maintenance log information, timestamps of other identified roadway hazards in proximity, etc. The physical and non-physical features identified and extracted at operation 702 may be associated with specific roadway items. Roadway items may include structural artifacts/deformities (e.g., potholes, ruts, cracks, etc.), construction signs, traffic lights, common roadway debris items (e.g., furniture), lane markings, roadway shoulders, medians, speed limit signs, communications towers, etc. Roadway items may be grouped into hazardous and non-hazardous categories.

At operation 704, at least one machine learning model is trained on the identified and extracted roadway features from operation 702. The machine learning model may be trained on the roadway features using a variety of machine learning algorithms, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. Targets (or target attributes) may be mapped to the features. For example, a certain physical feature (e.g., diameter measurement) may be associated with a pothole hazard. In other words, the certain physical features are mapped to the "target" roadway hazards. The machine learning model(s) is trained on this mapping of physical and non-physical features to roadway items to find and establish patterns and/or confirm the frequency of recognized patterns established by pattern recognizer 410. The machine learning model, once trained, will be able to identify future patterns in input data based on the previously mapped physical and non-physical features and previously recognized patterns.

At operation 706, input data is collected. Input data may include but is not limited to device type, device configuration information, vehicle information, sensor information, roadway features captured by vehicular sensors, GPS data, and other information associated with client devices and vehicular devices on a roadway, as well as environmental data around the client device and/or vehicle computer.

At operation 708, the input data is passed to a pattern recognizer (such as pattern recognizer 410), where the roadway features of the input data are identified and extracted and grouped together to form patterns. The roadway features may include both physical and non-physical features. The processing operations may include organizing the collected data into one or more groups and/or sorting the data according to one or more criteria in order to create and identify recognized patterns. The processing operations may additionally include separating certain physical features from one another and separating physical features from non-physical features. Further description of the roadway features are described with respect to the pattern recognizer 410 from FIG. 4.

At operation 710, the processed input data is provided to a machine learning engine (such as machine learning engine 415), where at least one trained machine learning model is applied to the processed input data. The trained machine learning model receives and evaluates the processed input data, which may include features vectors representing recognized patterns appearing in various roadway items. Comparison results may be generated by the trained machine learning engine. As a specific example, the machine learning engine may compare the identified and extracted roadway features of the received input data to at least one model trained on previously received roadway features and target attributes that are associated with specific roadway item identifiers. The comparison results generated by the trained machine learning model may be used to predict whether the input data is indicative of a roadway hazard, as opposed to a non-hazardous roadway object (e.g., speed limit sign, traffic light, median, etc.). In some aspects, the comparison results may include a roadway item risk indicator (e.g., 80% likelihood that the roadway item is associated with a known roadway hazard stored in the database) as to whether a certain roadway item is present in the processed input data. For example, the comparison results may include information indicating how confident the model is that one or more particular roadway hazards are present in the processed input data. In another aspect, the comparison results may include information on how confident the model is that one or more recognized patterns appear in the processed input data. The roadway item confidence results may be relied upon in determining the overall risk value, indicating the likelihood that a certain roadway item is either a roadway hazard or not.

At operation 712, the comparison results generated at operation 710 are classified as either hazardous or non-hazardous. In aspects, the comparison results from operation 710 may be converted into a risk value by aggregating the comparison results (e.g., pixel matches, object recognition, GPS location matches, etc.) and distilling those comparison results into a value (e.g., a percentage). The risk value may represent an arbitrary numeric value, e.g., on a scale from 1 to 10 with "1" representing a low confidence that a roadway item is a hazard and "10" representing a high confidence that a roadway item is a hazard. If a certain volume of features from the input data is found to be similar to previously processed roadway items based on the machine learning model(s), then a higher risk score may be generated. For example, if a risk threshold is set at "10 features," then the identification of eight physical and non-physical features from a recognized pattern of roadway hazards may produce a risk value of 80%. The confidence value may be compared to a risk threshold. In some aspects, the risk threshold may be a fixed threshold. In other aspects, the risk threshold may be dynamically set based on at least one machine-learning algorithm that is trained on previous risk and confidence threshold values and the success rate in identifying verified roadway hazards according to those previous risk and confidence threshold values. If the risk value equals or exceeds the risk threshold value, the input data may be confidently classified as a roadway hazard. For example, if the risk threshold is set at "7" and the risk value is "8," input data may be classified as a roadway hazard. If the risk value is less than the risk threshold value, the input data may be classified as a non-hazardous roadway item.

At operation 714, the comparison results are provided to a communications module (e.g., communications module 420) so that the results may be communicated to other vehicles on the roadway, other devices of drivers on the roadway, and/or interested third parties (e.g., government agencies and/or private entities responsible for maintaining a particular roadway). For example, upon detection of a roadway hazard, a signal transmission from a vehicle may be transmitted to a satellite, wherein the satellite relays the signal transmission to a central hub (e.g., government agency notification database), identifying the GPS coordinates and nature of the roadway hazard. In other aspects, if the comparison results from operation 712 indicate that the input data is non-hazardous, it may be determined that the results are not transmitted to other vehicles and/or devices.

Figure 8A:
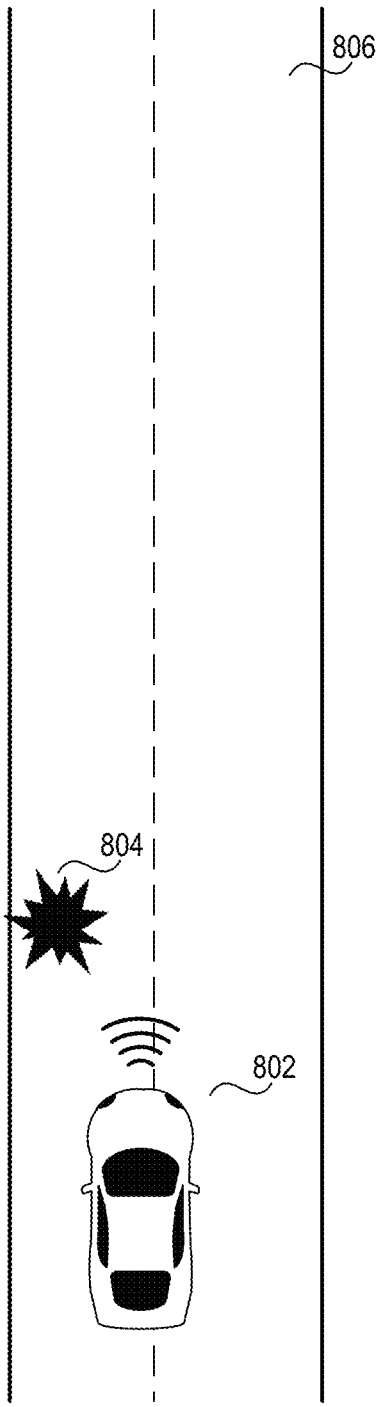
FIGS. 8A and 8B illustrate an example scenario of detecting a roadway hazard and responding to the detection of the hazard.
Figure 8B:
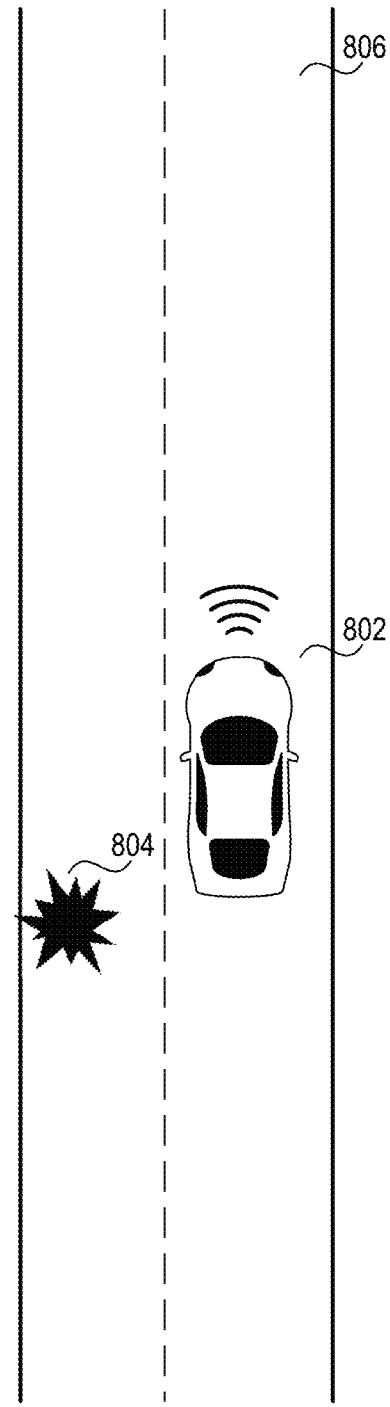

FIGS. 8A and 8B illustrate an example scenario of detecting a roadway hazard and responding to the detection of the hazard. FIG. 8A illustrates car 802 driving on roadway 806. A sensor (e.g., one of the sensors described with respect to FIG. 2) detects an upcoming roadway hazard 804. The detection of the roadway hazard 804 may be based on the receiving of both physical and non-physical environmental features in proximity to vehicle 802 and comparing those features against a trained machine learning model, wherein the comparison results indicate that roadway hazard 804 is indeed a roadway hazard. Upon detection of the roadway hazard 804, vehicle 802 may receive a command to alter its driving path to avoid colliding with hazard 804. As illustrated in FIG. 8B, the driving path of car 802 shifts to the right of roadway hazard 804, avoiding impact. In aspects involving autonomous vehicles, car 802 may receive a command to correct its driving path automatically. In aspects involving non-autonomous vehicles, a device associated with the driver of car 802 (e.g., a mobile phone) may alert the driver of the upcoming roadway hazard and recommend an alternate driving path. The driver of the non-autonomous vehicle may then respond to the alert by manually correcting the driving path of car 802 to avoid impact with roadway hazard 804.

Figure 9:
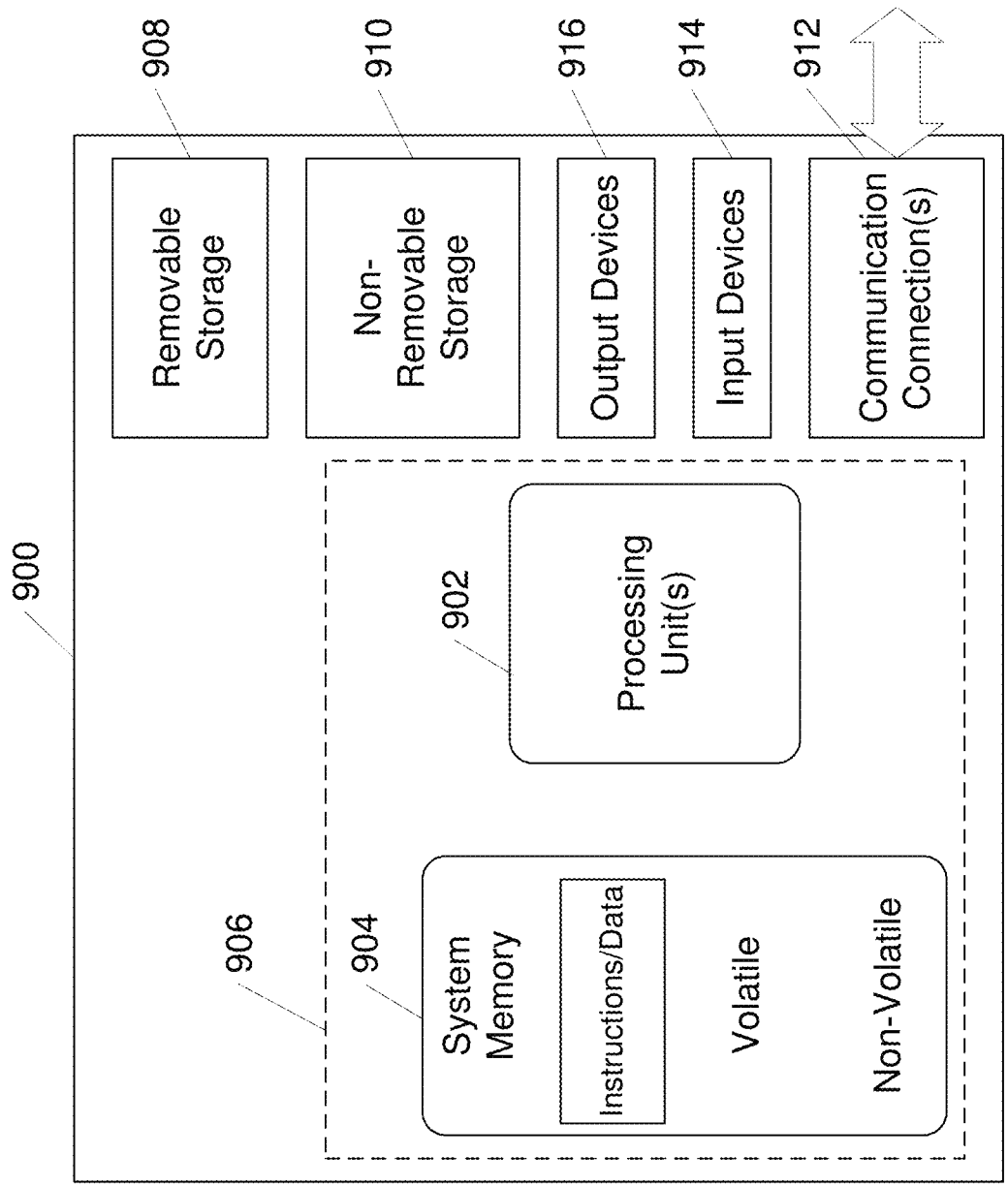
FIG. 9 illustrates one example of a suitable operating environment in which one or more of the present embodiments may be implemented.

FIG. 9 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, information related to detected devices, detected vehicles, association information, personal gateway settings, and instruction to perform the methods disclosed herein) may be volatile (such as RAM), non-volatile (such as ROM, flash memory, etc.), or some combination of the two. This most basic configuration is illustrated in FIG. 9 by dashed line 906. Further, environment 900 may also include storage devices (removable 908 and/or non-removable 910) including, but not limited to, magnetic or optical disks or tape. Similarly, environment 900 may also have input device(s) 914 such as keyboard, mouse, pen, voice input, vehicular sensors, etc. and/or output device(s) 916 such as a display, speakers, printer, vehicular parts (e.g., wheels, transmission, etc.), etc. Also included in the environment may be one or more communication connections, 912, such as Bluetooth, WiFi, WiMax, LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 900 may be a single computer (e.g., mobile computer and/or vehicular computer) operating in a networked environment using logical connections to one or more remote computers. The remote computer may be a personal computer, a server, a router, a network PC, a peer device, a vehicular computer, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method associated with a vehicle being in operation on a roadway for detecting and avoiding at least one roadway hazard comprising:
 receiving location information identifying the at least one roadway hazard on a surface of at least a portion of the roadway;

receiving positional data of the vehicle indicating a current position of the vehicle with respect to the roadway and to the at least one roadway hazard;

receiving, from at least one sensor connected to the vehicle, environmental data external to the vehicle;

receiving operational data associated with the vehicle;

based on the location information, positional data, environmental data, and operational data associated with the vehicle, calculating a roadway item risk value of the vehicle, wherein the roadway item risk value is calculated by considering a recognized pattern, wherein the recognized pattern is identified at least based on a comparison between the operational data associated with the vehicle with historical operational data associated with the recognized pattern, wherein the operational data includes braking data associated with the vehicle, wherein the operational data indicates a sudden change of the braking data associated with the vehicle;

comparing the roadway item risk value to a risk threshold;

when the roadway item risk value exceeds the risk threshold, calculating an alternative path;

based on the calculated alternative path, dynamically modifying a path of the vehicle; and displaying the alternative path on a display within the vehicle.

2. The method of claim 1, further comprising:

transmitting the location information of the roadway hazard to at least one remote device; and transmitting the environmental data external to the vehicle to the at least one remote device.

3. The method of claim 2, wherein the at least one remote device comprises at least one of: a mobile device, a vehicular computer, a personal computer, an electronic stop sign, a satellite, a central hub, and a server.

4. The method of claim 1, wherein the at least one roadway hazard comprises at least one of: ruts, potholes, bumps, dips, cracks, stopped vehicles, pedestrians, bicyclists, malfunctioning traffic lights, weather hazards, road debris, and reckless drivers.

5. The method of claim 1, wherein the location information of the at least one roadway hazard is received from one or more position sensors connected to the vehicle, a remote server communicably coupled to the vehicle, or another vehicle communicably coupled to the vehicle and traveling on the portion of the roadway.

6. The method of claim 1, wherein the positional data of the vehicle is received from at least one of: a LiDAR unit associated with the vehicle, a radar unit associated with the vehicle, a camera unit associated with the vehicle, or a GPS unit associated with the vehicle.

7. The method of claim 1, wherein the operational data associated with the at least one vehicle includes at least one of: a speed indication, a gyroscope indication, an axle angle indication, and fuel usage data.

8. The method of claim 1, wherein the environmental data external to the vehicle includes at least one of: an ambient temperature, an ambient pressure, an ambient humidity, a condition of the roadway, a wind speed, an amount of rainfall, an amount of snow, and an amount of ambient light.

9. The method of claim 1, wherein identifying the at least one roadway hazard comprises:

collecting data associated with a roadway item;

extracting a set of features from the data associated with the roadway item;

evaluating the set of features using at least one machine learning model;

generating the roadway item risk value based on the evaluation of the set of features; and when the roadway item risk value exceeds the risk threshold, classifying the roadway item as a roadway hazard.

10. The method of claim 9, wherein the roadway item risk value indicates a degree of similarity between the roadway item and a previously identified roadway hazard.

11. The method of claim 1, wherein the positional data of the vehicle is received from at least one of: a LiDAR unit associated with the vehicle, a radar unit associated with the vehicle, a camera unit associated with the vehicle, or a GPS unit associated with the vehicle.

12. The method of claim 1, wherein the operational data associated with the first vehicle includes at least one of: a speed indication, a braking indication, a gyroscope indication, an axle angle indication, and fuel usage data.

13. The method of claim 1, wherein the environmental data external to the vehicle includes at least one of an ambient temperature, an ambient pressure, an ambient humidity, a condition of the roadway, a wind speed, an amount of rainfall, an amount of snow, and an amount of ambient light.

14. A system comprising:

at least one processor; and a memory coupled to the at least one processor, the memory comprising computer executable instructions that, when executed by the at least one processor, performs the steps of:

receiving location information identifying at least one roadway hazard on a surface of at least a portion of the roadway;

receiving positional data of a first vehicle indicating a current position of the first vehicle with respect to the roadway and to the at least one roadway hazard;

receiving, from at least one sensor connected to the first vehicle, environmental data external to the first vehicle;

receiving operational data associated with the first vehicle;

based on the location information, positional data, environmental data, and operational data associated with the first vehicle, calculating a roadway item risk value of the first vehicle, wherein the roadway item risk value is calculated by considering a recognized pattern, wherein the recognized pattern is identified at least based on a comparison between the operational data associated with the first vehicle with historical operational data associated with the recognized pattern, wherein the operational data includes braking data associated with the first vehicle, wherein the operational data indicates a sudden change of the braking data associated with the first vehicle;

comparing the roadway item risk value to a risk threshold;

when the roadway item risk value exceeds the risk threshold, calculating an alternative path;

based on the calculated alternative path, dynamically modifying a path of the first vehicle;

displaying the alternative path on a display within the first vehicle; and transmitting the alternative path to a second vehicle proximal to the first vehicle.

15. The system of claim 14, wherein the at least one roadway hazard is at least one of: a pothole, a rut, a crack, a dip, a stopped vehicle, a pedestrian, a bicyclist, a malfunctioning traffic light, road debris, and a weather hazard.

16. The system of claim 14, wherein the alternative path is displayed in a map on the display, and wherein the map further displays traffic density information.

17. The system of claim 14, wherein the alternative path is displayed in a map on the display, and wherein the map further displays at least one alternative route.

18. The system of claim 14, wherein the alternative path is displayed in a map on the display, and wherein the map further displays a location of at least one of: a traffic light, a stop sign, and a roadway shoulder.

19. A vehicular system comprising:
   a non-transitory memory;
   a processor coupled to the memory, wherein the processor is configured to:
      receive location information identifying at least one roadway hazard on a surface of at least a portion of the roadway;
      receive positional data of a first vehicle indicating a current position of the first vehicle with respect to the roadway and to the at least one roadway hazard;
      receive, from at least one sensor connected to the first vehicle, environmental data external to the first vehicle;
      receive operational data associated with the first vehicle;
   based on the location information, positional data, environmental data, and operational data associated with the first vehicle, calculate a roadway item risk value of the first vehicle, wherein the roadway item risk value is calculated by considering a recognized pattern, wherein the recognized pattern is identified at least based on a comparison between the operational data associated with the first vehicle with historical operational data associated with the recognized pattern, wherein the operational data includes braking data associated with the first vehicle, wherein the operational data indicates a sudden change of the braking data associated with the first vehicle;
   compare the roadway item risk value to a risk threshold;
   when the roadway item risk value exceeds the risk threshold, calculate an alternative path;
   based on the calculated alternative path, dynamically modifying a path of the first vehicle;
   display the alternative path on a display within the first vehicle; and
   transmit the alternative path to a second vehicle proximal to the first vehicle.

20. The vehicular computer of claim 19, the processor further configured to: dynamically modify a path of the first vehicle based on the alternative path so as to avoid colliding with the at least one roadway hazard.

* * * * *

UNITED STATES PATENT AND TRADEMARK OFFICE
CERTIFICATE OF CORRECTION

PATENT NO. : 12,051,247 B2
APPLICATION NO. : 16/585667
DATED : July 30, 2024
INVENTOR(S) : Nathan McBeth and John Huynh Page 1 of 1

It is certified that error appears in the above-identified patent and that said Letters Patent is hereby corrected as shown below:

In the Claims

Claim 14, Line 28, delete "performs" and insert --perform--

Claim 19, Line 16, delete "modifying" and insert --modify--

Claim 20, Line 21, after "vehicular" delete "computer" and insert --system--

Signed and Sealed this
Tenth Day of September, 2024

Katherine Kelly Vidal
*Director of the United States Patent and Trademark Office*